(12) United States Patent
Kampasi et al.

(10) Patent No.: US 11,745,454 B2
(45) Date of Patent: Sep. 5, 2023

(54) HIGH RESOLUTION AND HIGH FLEXIBILITY FIBER OPTICAL CABLES AND MICROFABRICATION METHODS FOR MAKING SAME

(71) Applicant: Lawrence Livermore National Security, LLC, Livermore, CA (US)

(72) Inventors: Komal Kampasi, San Francisco, CA (US); Razi-Ul Muhammad Haque, San Francisco, CA (US); Michael Gregory Triplett, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 17 days.

(21) Appl. No.: 17/307,833

(22) Filed: May 4, 2021

(65) Prior Publication Data

US 2022/0355558 A1 Nov. 10, 2022

(51) Int. Cl.
*G02B 6/02* (2006.01)
*B29D 11/00* (2006.01)

(52) U.S. Cl.
CPC .. *B29D 11/00663* (2013.01); *B29D 11/00875* (2013.01); *G02B 6/02033* (2013.01)

(58) Field of Classification Search
None
See application file for complete search history.

(56) References Cited

U.S. PATENT DOCUMENTS 5,237,638 A * 8/1993 Narcisco, Jr. ...... G02B 6/02033
385/123
10,725,236 B2 * 7/2020 Kim ................. B29D 11/00663
(Continued)

FOREIGN PATENT DOCUMENTS

WO WO-2021228380 A1 * 11/2021

OTHER PUBLICATIONS

Choi, M., Humar, M., Kim, S. and Yun, S.-H. (2015), Step-Index Optical Fiber Made of Biocompatible Hydrogels. Adv. Mater., 27: 4081-4086. https://doi.org/10.1002/adma.201501603 (Year: 2015).*
(Continued)

*Primary Examiner* — Rhonda S Peace
(74) *Attorney, Agent, or Firm* — Harness, Dickey & Pierce, P.L.C.

(57) ABSTRACT

The present disclosure relates to methods of forming a fiber optic core, and a fiber optic component with a highly uniform cladding covering the fiber optic core. In one microfabrication process a first sacrificial tubing is provided which has a predetermined inner diameter. A quantity of a curable polymer is also provided. The first sacrificial tubing is at least partially filled with the curable polymer. The curable polymer is then cured. The first sacrificial tubing is then removed to produce a finished fiber optic core. Additional operations may be performed by which the fiber optic core is placed inside a thermoplastic tubing, which is itself placed inside a sacrificial heat shrink. Heat is applied to reflow the thermoplastic tubing around the fiber optic core, thus forming a highly uniform thickness cladding. When the sacrificial heat shrink tubing is removed a finished fiber optic component is present. Additional microfabrication methods are disclosed which involve dip coating a preformed fiber optic core in a polymer, and then curing the polymer to form a finished fiber optic component with a uniform thickness cladding.

11 Claims, 6 Drawing Sheets

(56) References Cited

U.S. PATENT DOCUMENTS

2009/0152746 A1    6/2009  Wells et al.
2022/0194034 A1*   6/2022  Lwin .................... D01F 6/16

OTHER PUBLICATIONS

Evertz, A., Schrein, D., Olsen, E., Hoffmann, G. A. and Overmeyer, L., Dip coating of thin polymer optical fibers. Optical Fiber Technology. 2021, p. 102638.

* cited by examiner

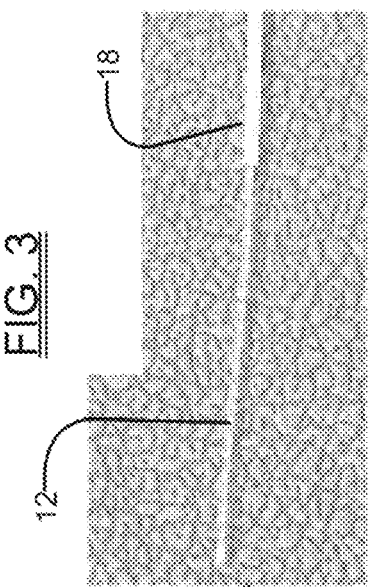
FIG. 2
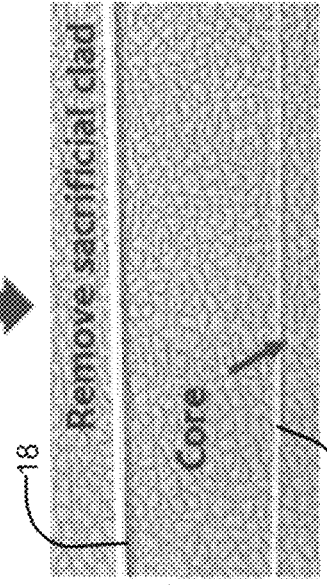
FIG. 3
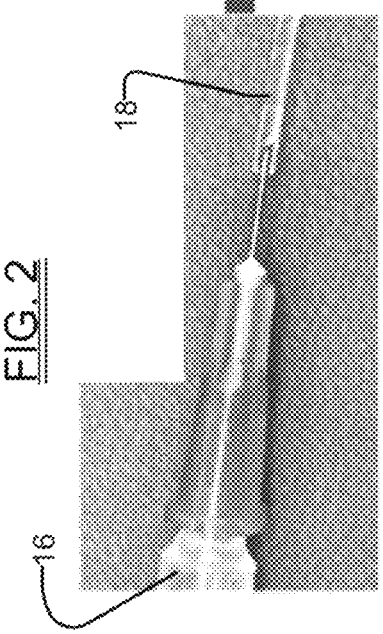
FIG. 5
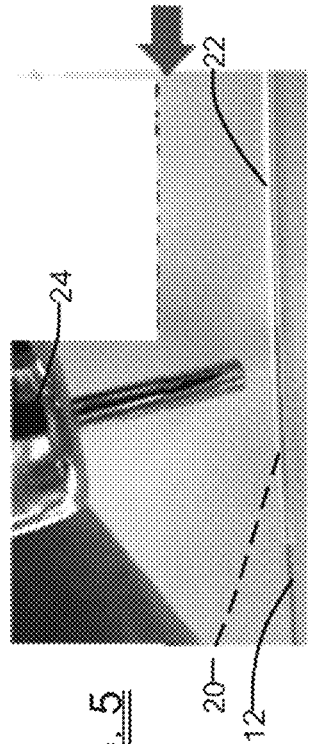
FIG. 4
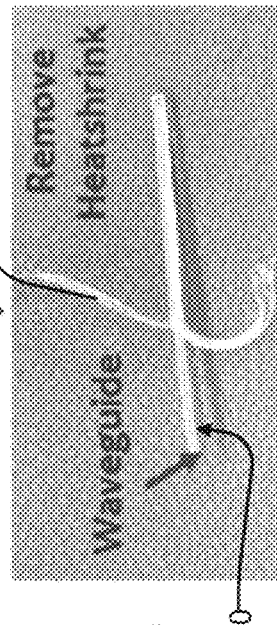
FIG. 6

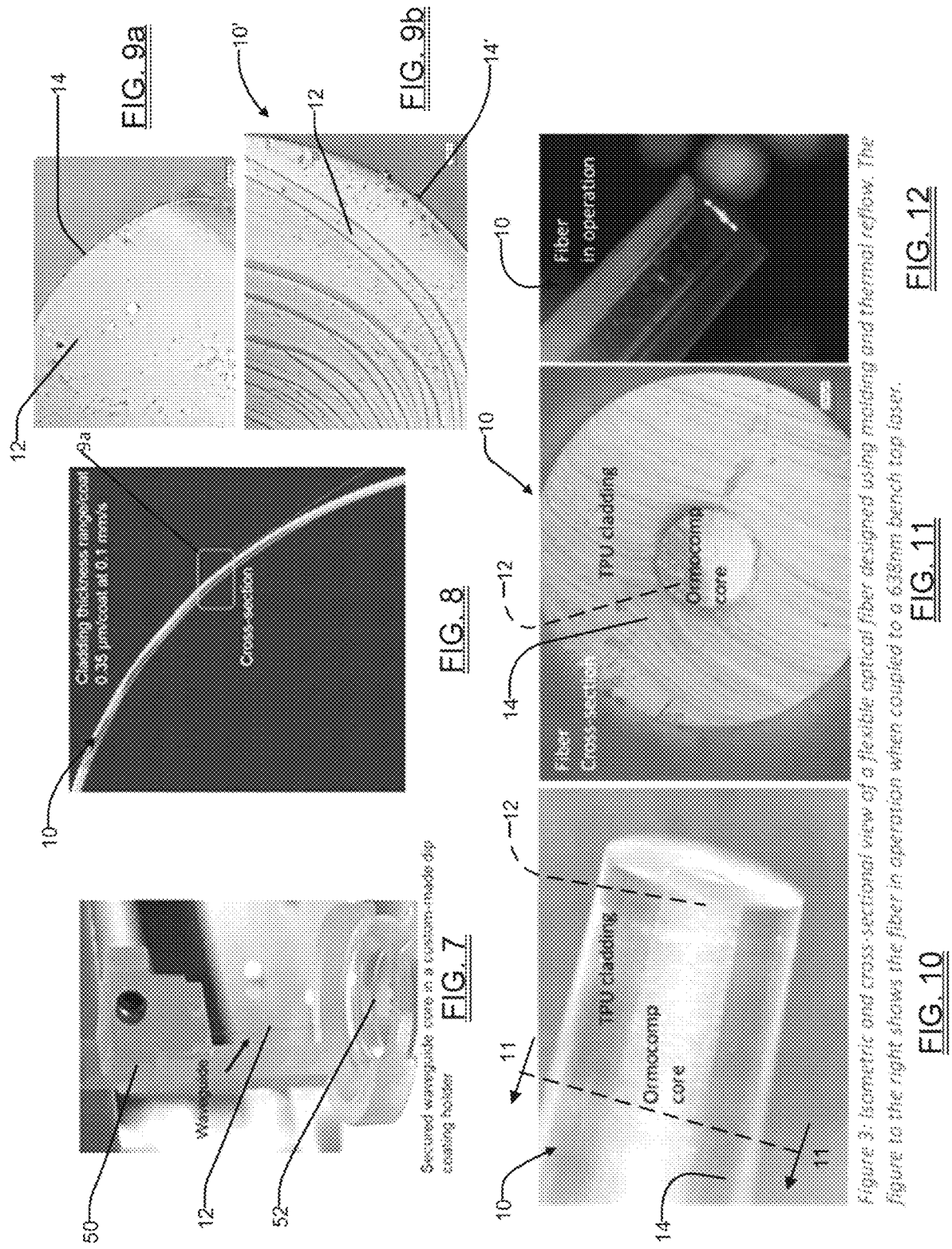

Core Molding

HIGH RESOLUTION AND HIGH FLEXIBILITY FIBER OPTICAL CABLES AND MICROFABRICATION METHODS FOR MAKING SAME

STATEMENT OF GOVERNMENT RIGHTS

This invention was made with Government support under Contract No. DE-AC52-07NA27344 awarded by the United States Department of Energy. The Government has certain rights in the invention.

FIELD

The present disclosure relates to the construction of fiber optic cables, and more particularly to high-resolution, highly flexible fiber optic cables and methods of microfabrication which significantly broaden the types of core and cladding materials that may be used during manufacture of the fiber optic cables, and which better enable integration with other microfabrication techniques to produce integrated optoelectronic systems which are especially well suited for medical applications, and particularly medical applications involving implantable biomedical optoelectronic systems.

BACKGROUND

The statements in this section merely provide background information related to the present disclosure and may not constitute prior art.

Commercial fiber optic cables are the current standard for carrying optical signals in commercial industries like communications or medical devices. However, the glass fibers are often brittle with limited selection of materials and dimensions and hence not suitable for applications that require flexibility and re-routing. Recent LED based optical solutions are compact and flexible but suffer from low power conversion efficiencies and thermal losses. These limitations are detrimental for many applications, and particularly in applications involving medical devices.

The above limitations are particularly significant in certain medical applications, and particularly with present day optical cochlear implants. For example, present day optical fiber light delivery system-based cochlear implants are relatively stiff, have a limited insertion depth in the cochlea, and require relatively large diameter optical fibers. The relatively large diameter is caused by the thick cladding covering the core material of the optical fiber.

Present day LED light delivery system-based provide for a fully assembled "optrode" which has the LEDs and a silicone backbone formed as an integrated assembly. These optrode devices are more flexible and bendable than the traditional optical fiber light delivery system described above, but they suffer from limited power handling capability, less than desirable wall-plug efficiency and require high operating currents. Furthermore, they have not been tested in cochlea implant applications.

SUMMARY

This section provides a general summary of the disclosure, and is not a comprehensive disclosure of its full scope or all of its features.

In one aspect the present disclosure relates to a method of forming a fiber optic core component. The method may comprise providing a first sacrificial tubing having a predetermined inner diameter, and providing a quantity of a curable polymer. The method may include at least partially filling the first sacrificial tubing with the curable polymer and then curing the curable polymer. The method may further include removing the first sacrificial tubing to produce a fiber optic core.

In another aspect the present disclosure relates to a method for forming a fiber optic component. The method may comprise providing a pre-formed fiber optic core, and then dipping the fiber optic core into a curable polymer and withdrawing the fiber optic core from the curable polymer at a predetermined rate of travel. The method may further include waiting a predetermined time period to allow the curable polymer to at least partially cure and harden to form a partially cured cladding. The method may further include fully curing the partially cured cladding to form a fully cured cladding of a predetermined thickness over the fiber optic core.

In another aspect the present disclosure relates to a method of forming a fiber optic component. The method may comprise providing a first sacrificial tubing having a predetermined inner diameter, and providing a quantity of a curable polymer. The method may further include at least partially filling the first sacrificial tubing with the curable polymer, and then curing the curable polymer. The method may further include removing the first sacrificial tubing to reveal a fiber optic core. The method may further include providing a sacrificial heat shrink tubing, and providing a thermoplastic tubing inside the sacrificial heat shrink tubing. The method may further include placing the fiber optic core inside the thermoplastic tubing and then applying heat to the thermoplastic tubing to thermally reflow material of the thermoplastic tubing around the fiber optic to form a cladding around the fiber optic core. The method may further include removing the heat shrink tubing to reveal a fully formed fiber optic component.

In still another aspect the present disclosure relates to a method for forming a fiber optic component. The method may include providing a sacrificial heat shrink tubing, providing a thermoplastic tubing inside the sacrificial heat shrink tubing and providing a mandrel having a predetermined outer diameter selected to be equal to a desired outer diameter of a fiber optic core component. The method may further include placing the mandrel inside the thermoplastic tubing and applying heat to the thermoplastic tubing to thermally reflow material of the thermoplastic tubing around the mandrel to form a cladding layer. The method may further include removing the mandrel to leave the cladding layer, and forming the fiber optic optical core by at least partially filling the cladding layer with a quantity of a curable polymer. The method may further include curing the curable polymer and then removing the sacrificial heat shrink tubing to produce a fiber optic component.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 2 is an illustration of a first operation performed in a new molding and thermal reflow fabrication method, where a selected liquid polymer is initially injected into a sacrificial tubing, wherein the sacrificial tubing has a precisely selected inner diameter;

FIG. 3 shows a subsequent operation in which the selected liquid polymer is cured to form an optical core component for the optical fiber, in this example by the application of UV light;

FIG. 4 shows a subsequent operation in which the sacrificial tubing has been removed to reveal the just-formed optical core component;

FIG. 5 shows a subsequent thermal reflow operation in which the optical core component is first inserted into length of thermoplastic polyurethane tubing (TPU), which in turn resides coaxially inside a section of sacrificial heat shrink tubing, and where heat is applied to the outside of the sacrificial heat shrink tubing to reflow the TPU material over the optical core component to form a new cladding for the optical core component;

FIG. 6 shows the sacrificial heat shrink tubing being removed to reveal the newly formed optical fiber component with the TPU cladding evenly flowed over the optical core component;

FIG. 7 illustrates a first operation of another method of fabrication of an optical fiber component of the present disclosure in accordance with a new dip coating fabrication process, wherein an optical core component is secured in a dip coating holder;

FIG. 8 shows an image of a portion of a dip coated optical core component illustrating the thin, highly controlled conformal cladding that is formed around the optical core component;

FIG. 9a shows a highly enlarged cross sectional view of the rectangular section 9 in FIG. 8, better illustrating the relative thicknesses of the core and cladding;

FIG. 9b shows the cladding after four coats, illustrating the significantly increased thickness of the cladding layer;

FIG. 10 shows a highly enlarged image of a section of a flexible optical fiber component formed in accordance with the molded and thermal reflow process of FIGS. 2-6;

FIG. 11 is a cross sectional view of the flexible optical fiber of FIG. 10 taken in accordance with section line 11-11 in FIG. 10;

FIG. 12 shows the optical fiber component of FIGS. 10 and 11 during operation while being used in a laboratory environment with a 638 nm bench laser;

DETAILED DESCRIPTION

Example embodiments will now be described more fully with reference to the accompanying drawings.

The present disclosure is directed to the design and construction of high-resolution flexible optical fibers with customized materials and provide a wide range of design dimensions for core and cladding. The construction of the various embodiments discussed herein may be carried out using additive manufacturing techniques such as, without limitation, molding and thermal reflow, dip coating, printing, etc. The designed fibers can be conveniently coupled with flip-chipped laser diodes, photodetectors or bench-top lasers at the backend, placing them far away from the site of operation and thus preventing or dramatically reducing thermal load. The fiber design techniques disclosed herein are modular, and thus can be integrated with a combination of microfabrication techniques for integrated optoelectronic systems with customized design platforms for various applications. The methods of the present disclosure integrate novel materials with the assignee's established techniques of microfabrication, additive manufacturing and flip-chip bonding to implement efficient 2D and 3D systems and leverage them for the development of high-resolution, highly flexible, durable, and custom-designed integrated flexible optical systems to more effectively enable integrated polymer photonics for a wide range of applications.

Figure 1:
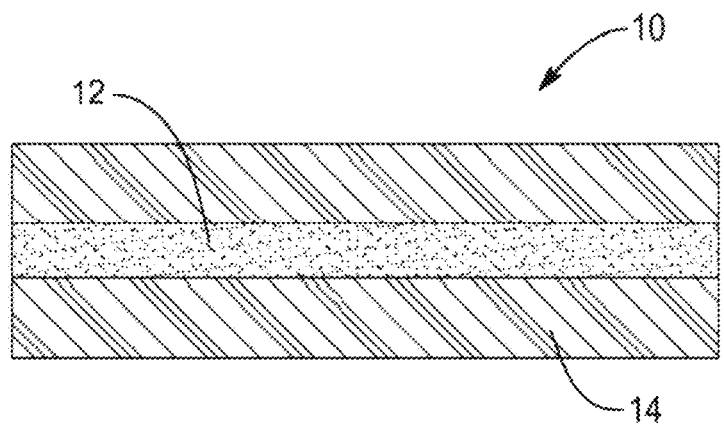
FIG. 1 is a high level, highly enlarged side cross sectional view of a portion of a fiber optic cable in accordance with one embodiment of the present disclosure

Referring to FIG. 1, a highly enlarged, simplified, cross-sectional view of a section of a highly flexible optical fiber component 10 made in accordance with the present disclosure is shown. The optical fiber component 10 includes an optical core 12 surrounded by a cladding 14. The core may be formed from any material having favorable optical qualities and characteristics, but one particular material that is highly preferred is ORMOCOMP® photopolymer, available from Micro Resist Technology GmbH of Berlin, Germany. ORMOCOMP® photopolymer is highly desirable for its excellent optical transparency and high thermal stability. The cladding 14 may likewise be formed from any suitable material, although one particularly desirable material is CYTOP® fluoropolymer, which is suitable for forming thin film coatings of less than 1 µm in thickness, and which is commercially available from AGC Chemicals (https://www.agc-chemicals.com/jp/en/fluorine/products/detail/index.html?pCode=JP-EN-F019). Other potential materials for the optical core 12, without limitation, are SU-8, parylene, Epocore etc. Other potential materials for the cladding 14 are, without limitation, PDMS, Epoclad, silicone, etc.

The optical fiber component 10, in some embodiments, may have an optical core 12 diameter of as little as 1 µm-5 µm, and the specific diameter selected may be chosen to optimize the optical fiber component 10 for use in a specific application. Applications requiring bends or turns around of very small radii are likely to require smaller diameter optical cores. The cladding 14, in some embodiments, may have a thickness on the order of 10s or 100s of microns, and this dimension is also likely to be largely determined to optimize the optical fiber component 10 for use in a specific application.

Figure 5A:
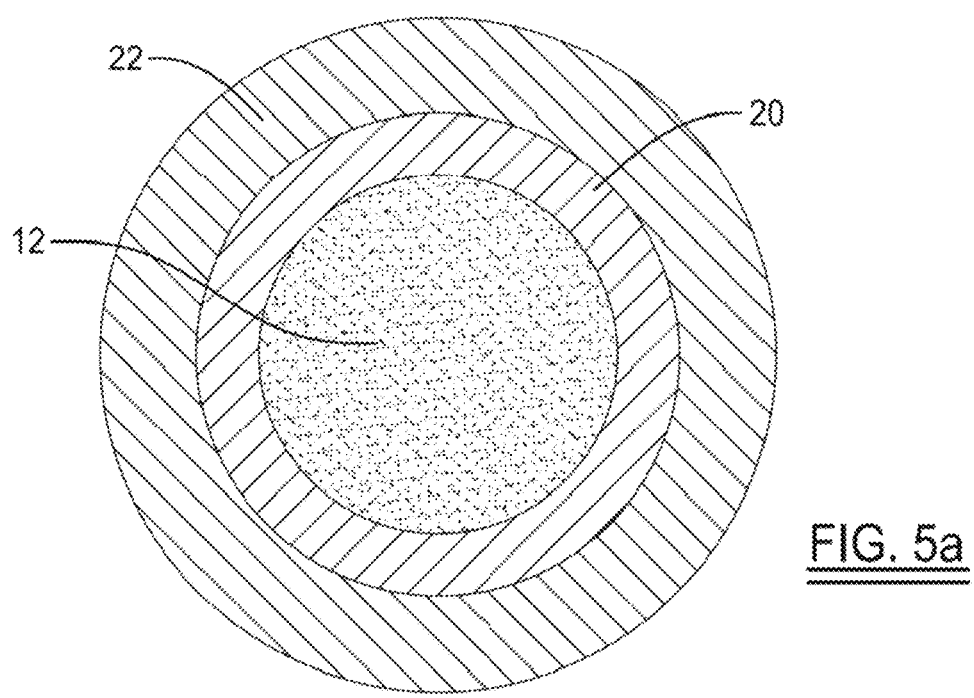
FIG. 5a is a cross sectional end view showing the coaxial arrangement of the thermoplastic tubing, the sacrificial heat shrink and the optical core, just prior to beginning the thermal reflow operation shown in FIG. 5.

FIGS. 2-5 illustrate operations that may be performed in carrying out a molding and thermal reflow microfabrication process to construct the optical fiber component 10. In FIG. 2, a syringe 16 may be used to inject a quantity of a polymer, in one example a photopolymer such as ORMOCOMP® photopolymer, into a sacrificial tubing 18. The sacrificial tubing 18 may be a plastic tubing with an inner diameter selected to produce the optical core 12 with a precise outer diameter. FIG. 3 illustrates a portion of the newly formed optical core 12 after being UV cured, with the newly formed optical core partially removed from the sacrificial tubing 18. UV curing typically takes between about a few seconds to tens of minutes, and will depend at least in part on the diameter of the optical core 12, the wall thickness and material of the sacrificial tubing 18, and the power of the UV light source. FIG. 4 illustrates the optical core 12 fully removed from the sacrificial tubing 18. The optical core 12 may be easily withdrawn by stripping away the sacrificial tubing from the surface of the core. In FIG. 5, a thermal reflow operation is performed after the optical core 12 has been inserted inside a thermoplastic tubing 20, which itself has been inserted coaxially in an outer sacrificial heat shrink tubing 22, as shown in FIG. 5a. The final thickness of the cladding layer 14 may depend on several factors including, but not limited to, the difference between the inner diameter of the thermoplastic tubing 20 and the outer diameter of the optical core 12, the diameter and coefficient of thermal expansion of the thermoplastic tubing 20, the shrink ratio and maximum recovered inner diameter of the sacrificial heat shrink tubing 22, and the heating temperature. Generally, the cross sectional area of final cladding layer 14 will be typically within about 5% of the initial cross sectional area of the thermoplastic tubing 20. Cladding thicknesses down to at least about 50 µm are obtainable using the above described process.

A heat gun 24 (FIG. 5) may be used to apply heated air, typically 150 degrees C.-350 degrees C., or possibly even higher for specific types of thermoplastics, for a desired time period (e.g., a few seconds to tens of minutes) to fully melt and reflow the thermoplastic sleeve 20 over and uniformly around the optical core 12. FIG. 6 shows the sacrificial heat shrink tubing 22 being removed, revealing the newly formed optical fiber 10 with its newly formed cladding 14 uniformly covering the optical core 12.

Figure 6A:
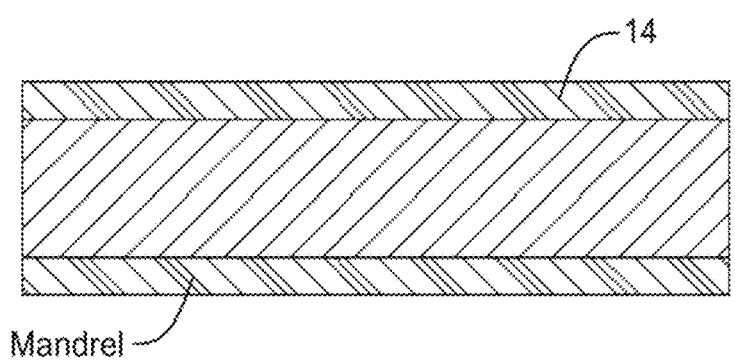
FIG. 6a shows another method for forming the sacrificial cladding layer by using a mandrel.
Figure 15:
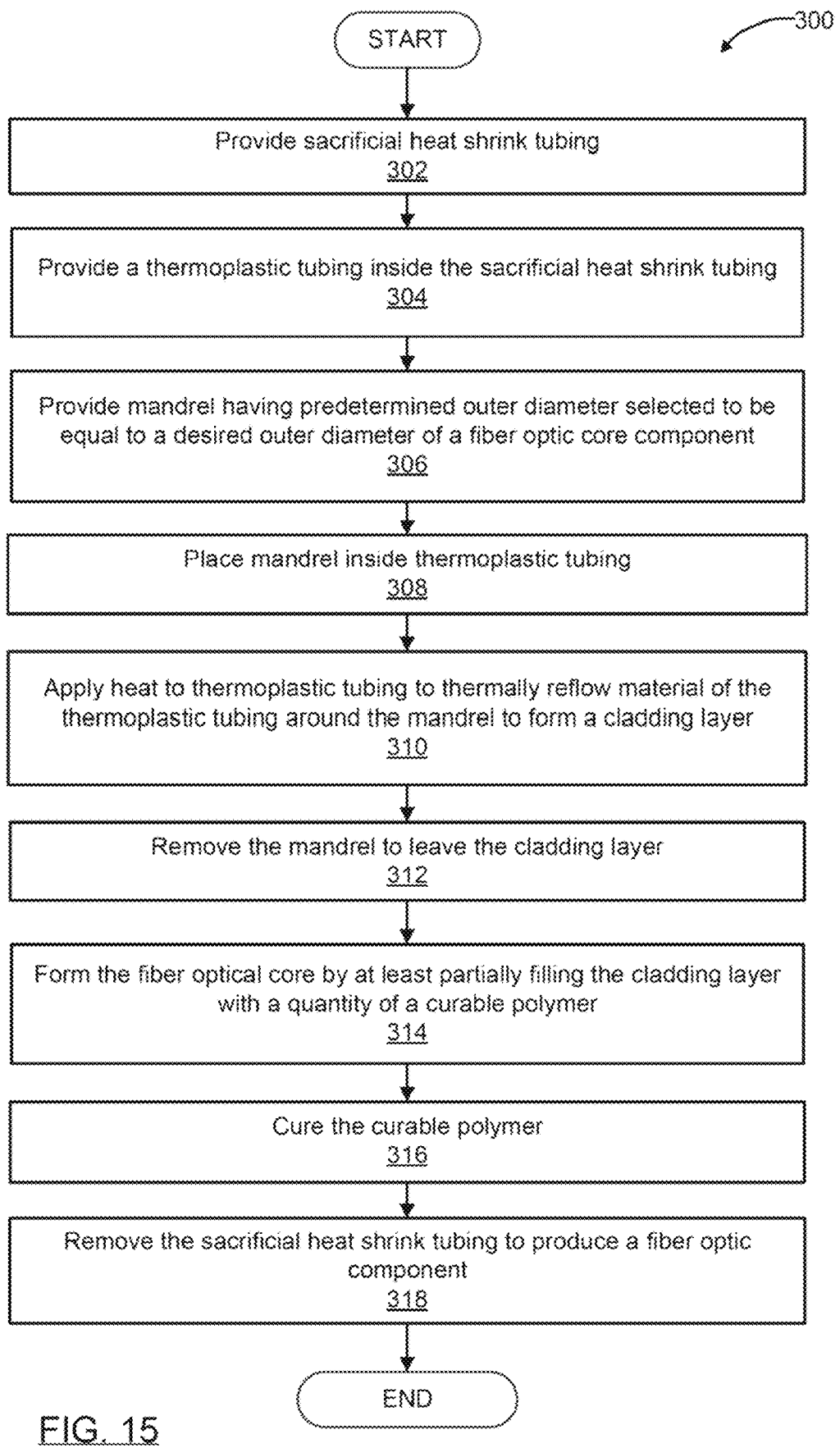
FIG. 15 is a flowchart illustrating one example of operations that may be performed when using a mandrel to manufacture a fiber optic component.

The thermal reflow process of FIGS. 2-6 may also be performed over a mandrel M instead of the optical core 12 to form the cladding layer 14, as shown in highly simplified form in FIG. 6a. In this case, the mandrel M is removed after the reflow process and the optical core 12 is molded as depicted in FIG. 2 using the newly formed cladding layer 14 as the sacrificial tubing 18. The optical core 12 is then cured to form the final fiber optic component 10. In this iteration of the core molding process, the diameter of the optical core 12 is defined by the selected outer diameter of the mandrel M used during the reflow process and the cladding layer 14 is not removed after the optical core 12 is cured. So the operations of manufacture of the optical component when using the mandrel M are summarized in the operations listed in flowchart 300 of FIG. 15, as follows:

a) provide a sacrificial heat shrink tubing (operation 302);
b) provide a thermoplastic tubing inside the sacrificial heat shrink tubing (operation 304);
c) provide the mandrel M having a predetermined outer diameter selected to be equal to a desired outer diameter of a fiber optic core component (operation 306);
d) place the mandrel M inside the thermoplastic tubing (operation 308);
e) apply heat to the thermoplastic tubing to thermally reflow material of the thermoplastic tubing around the mandrel M to form a cladding layer (operation 310);
f) remove the mandrel M to leave the cladding layer (operation 312);
g) form the fiber optic optical core by at least partially filling the cladding layer with a quantity of a curable polymer (operation 314);
h) curing the curable polymer (operation 316); and
removing the sacrificial heat shrink tubing to produce a fiber optic component (operation 318).

Referring now to FIGS. 7-12, a dip coating process for forming the optical fiber component 10 will be described. With the dip coating process a dip coating holder structure 50, one example of which is shown in FIG. 7, is used to hold the optical core 12 after the optical core has been formed, for example as described above in connection with FIGS. 2-4. The holder structure 50 holds the optical core 12 at one end and lowers the free length of the optical core 12 into a suitable polymer cladding material 52. One example of a suitable cladding material is CYTOP® fluoropolymer as mentioned above. Highly controlled linear up and down movement of the holder structure 50 may be controlled using any suitable mechanical or electromechanical mechanism, for example a robotic arm (not shown).

The cladding material 52 at this step is uncured and in a fluid or flowable state, so that an even, uniform coating is applied to the optical core 12 as the optical core is dipped into, and then withdrawn from, a reservoir holding a quantity of the cladding material. FIG. 8 shows the resulting microfabricated optical fiber component 10 with one coat of the newly formed cladding layer 14 thereon (i.e., the cladding material 52 becomes the cladding layer 14 once cured). The cladding layer 14 in this example was produced when the optical core 12 was moved (i.e., withdrawn) at a rate of about 0.1 mm/second. This is just one example, and the rate of movement of the optical core 12 when coating the optical core with the cladding material 52 may vary depending on the desired thickness of the cladding, the precise cladding material being used and its temperature, the geometry of the optical core 12, and various environmental factors including temperature, airflow, and humidity. FIG. 9a shows a highly enlarged image of a portion of a cross-section of the optical fiber component 10 with two coats of the cladding layer 14 produced from cladding material 52. The cladding thickness in this example was about 0.75 µm.

FIG. 9b shows a highly enlarged image showing another embodiment of an optical fiber component 10', which is similar to the optical fiber component 10, but which has four coats of the cladding material 52, thus forming a substantially thicker cladding layer 14'. FIG. 10 illustrates a highly enlarged perspective image of the optical fiber component 10, and FIG. 11 illustrates a highly enlarged cross-section image of the optical fiber component 10 shown in FIG. 10. FIG. 12 shows the optical fiber component 12 being used with a 683 nm bench top laser. The optical fibers 10 and 12 shown in FIGS. 10-12 were formed using the thermal reflow methodology described in connection with FIGS. 2-6.

Figure 13:
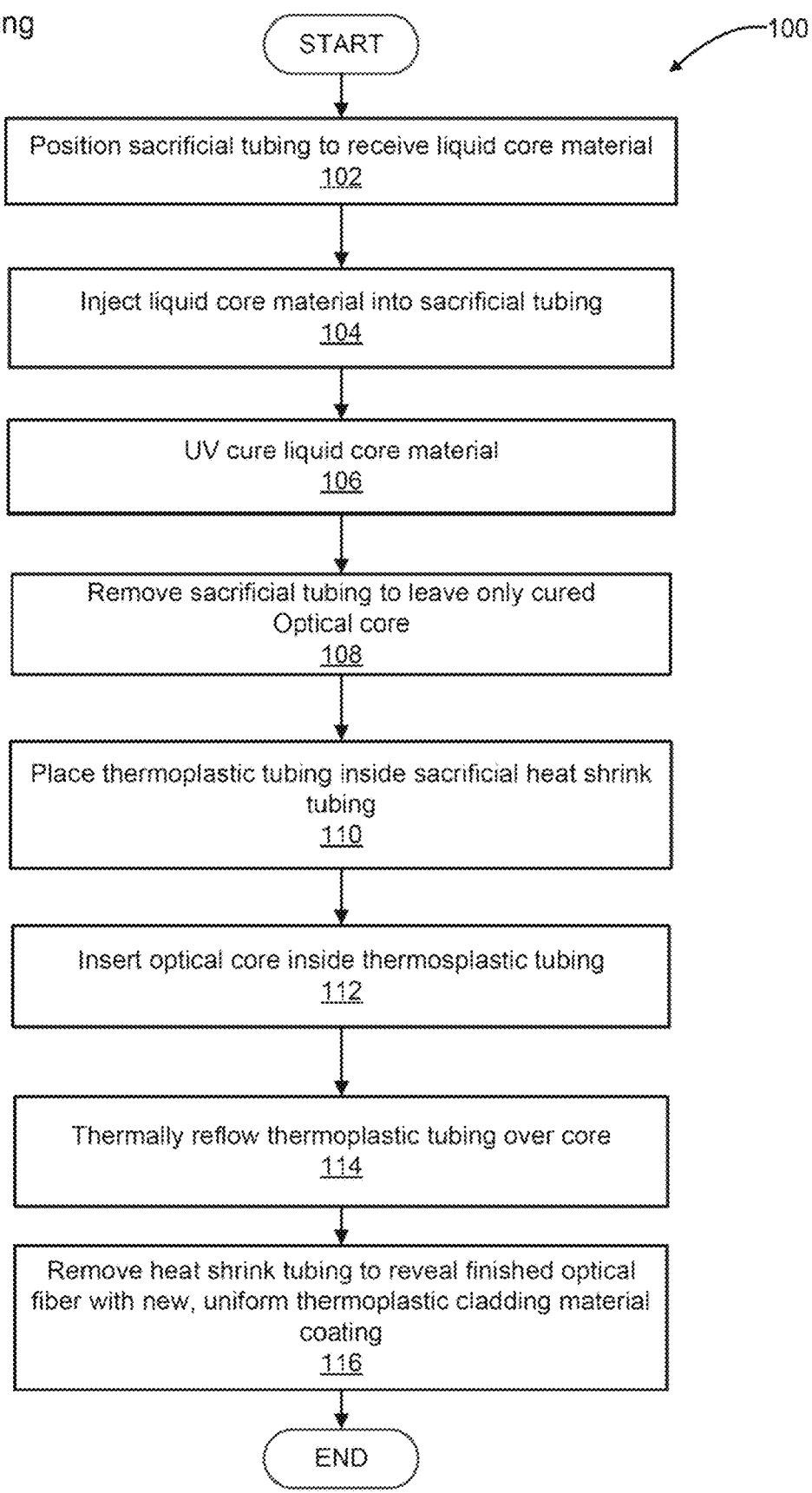
FIG. 13 is a flowchart summarizing one example of major operations that may be performed when carrying out the optical core molding and thermal reflow fabrication process shown in FIGS. 2-6.

FIG. 13 is a flowchart 100 summarizing major operations in microfabricating the fiber optic component 10 using the molding and thermal reflow fabrication process of FIGS. 2-6. It will be appreciated that using the mandrel M of FIG. 6a will require a slightly different workflow, as explained above, to create the cladding 14, which can then be used as the sacrificial tubing for creating the optical core 12. In FIG. 13, at operation 102 the sacrificial tubing 18 is positioned to receive the liquid photopolymer core material that will form the optical core 12. The liquid photopolymer core material is injected into the sacrificial tubing 18 at operation 104. At operation 106 the photopolymer liquid core material is cured with UV light. At operation 108 the sacrificial tubing 18 is removed to reveal the finished optical core 12. At operation 110 the thermoplastic tubing 20 (e.g., thermoplastic polyurethane tubing) is placed inside the sacrificial heat shrink tubing 22. At operation 112 the optical core 12 is placed inside the thermoplastic tubing 20. At operation 114 the thermoplastic tubing 20 is thermally reflowed via the application of heat to form a highly uniform cladding layer 14 with a desired wall thickness on the optical fiber 12. At operation 116 the sacrificial heat shrink tubing 22 is then removed revealing the finished optical fiber component 10.

Figure 14:
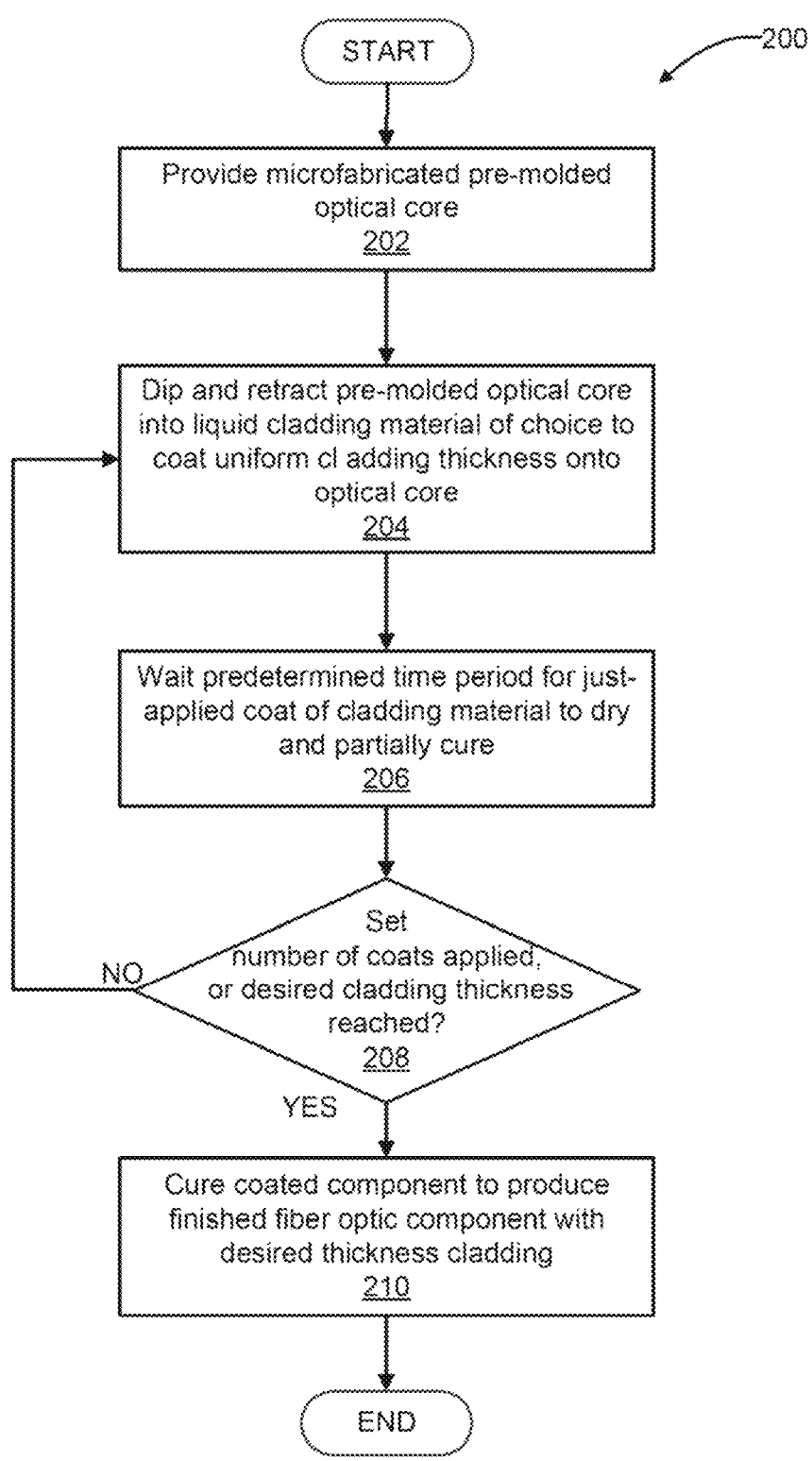
FIG. 14 is a flowchart summarizing one example of major operations that may be performed when carrying out the dip coating fabrication process illustrated in FIG. 7.

FIG. 14 shows a flowchart 200 which summarizes high level operations performed in carrying out the dip coating fabrication process of FIGS. 7-9b. At operation 202 the microfabricated, pre-molded optical core 12 is provided on which a cladding will be formed. At operation 204 the optical core 12 is dipped into the cladding material 52 and then withdrawn at a desired rate of movement. Drying and partial curing of the cladding material 52 occurs over a predetermined time period, for example and without limitation, typically between about 5 minutes-15 minutes, as indicated at operation 206. At operation 208 a check is made to determine if the set number of coats has been applied. If not, then operations 204 and 208 are repeated. If the check at operation 208 indicates that the set number of coats has been applied, then the cladding 14 is fully cured to produce the finished fiber optic component 10.

The methods described herein can also be combined in various ways to form optical fibers consisting of a core and one or more cladding layers. For example, a molded core (sacrificial mold) can be used as a non-sacrificial core in the thermal reflow process described above to add a cladding layer. The thermal reflow process can be applied over a sacrificial core to fabricate a cladding layer which can then be used as a non-sacrificial mold in the core molding process. The dip coating process described herein can be applied to a molded core to form an optical fiber with one or more cladding layers. Still further, a molded core with cladding layers added via the dip-coating process described herein can then be used as a non-sacrificial core in the thermal reflow process to add additional cladding layers. These are but a few modifications and combined uses of the methodologies described herein, and it will be appreciated that the present disclosure is not limited to only these specific variations and combinations.

One particularly important advantage of the present disclosure is that the microfabrication processes described herein are not limited to only short length scales, but can easy be employed to make longer length (e.g., 10 cm-20 cm or even longer) fiber optical components. Another important advantage is that the optical core 12 diameter is highly controlled. Still another advantage is the optical core 12 can be used with or without cladding. Still another advantage is that cladding layers having closely controlled, desired thicknesses, can be easily formed to best meet the needs of specific applications. Still another advantage is that the microfabrication methods described herein enable a wide variety of material choices for forming the optical core 12 and the cladding 14, to best meet the needs of different applications and environments in which the optical fiber component 10 will be used.

The various optical fiber components 10 and 10' of the present disclosure can be used to form highly flexible, efficient and integrated optoelectronics subsystems that can expand the accessible design space across multiple areas of research. Such areas may include, without limitation, high-density optoelectronic MEAs, implantable optical delivery systems such as cochlear implants, optical monitoring medical devices such as endoscopes, and a wide variety of other devices both within the medical device industry and in other industries where highly flexible fiber optic components are needed. The present disclosure enables a unique and comprehensive way of engineering integrated optoelectronic systems with flexible and customized fiber optic solutions, and in some instances the small size and flexibility of the fiber optic components described herein is expected to make possible and practical the use of fiber optic cables in applications where such components have traditionally not been useable due to dimension and/or flexibility limitations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of forming a fiber optic component, comprising:
   providing a first sacrificial tubing having a predetermined inner diameter;
   providing a quantity of a curable polymer;
   at least partially filling the first sacrificial tubing with the curable polymer;
   curing the curable polymer;
   removing the first sacrificial tubing to produce a fiber optic core;
   forming a cladding on the fiber optic core by thermally reflowing a thermoplastic over the fiber optic core, to form the fiber optic component.

2. The method of claim 1, wherein the curable polymer comprises a curable photopolymer curable by an application of ultraviolet light.

3. The method of claim 2, wherein the curing of the photocurable polymer is performed over a time period of a few seconds to tens of minutes.

4. The method of claim 1, wherein the thermally reflowing of the thermoplastic over the fiber optic core comprises heating a thermoplastic tubing having a predetermined inner diameter, within which the fiber optic core is placed, to uniformly reflow the thermoplastic tubing over the fiber optic core to form the cladding, and wherein the cladding cross sectional area is closely associated with a cross sectional area of the thermoplastic tubing.

5. The method of claim 4, wherein the thermally reflowing of the thermoplastic over the fiber optic core comprises:
   placing a thermoplastic tubing inside a sacrificial heat shrink tubing, with the thermoplastic tubing having a predetermined inner diameter;
   inserting the fiber optic core at least partially into the thermoplastic tubing;
   applying heat to thermally reflow material forming the thermoplastic tubing over the fiber optic core to form the cladding; and
   allowing the material to cool to solidify the cladding.

6. The method of claim 5, removing the sacrificial heat shrink tubing from the cladding to reveal the fiber optic component.

7. The method of claim 1, wherein the cladding has a thickness of about tens of μm to about tens of mm.

8. A method of forming a fiber optic component, comprising:
   providing a first sacrificial tubing having a predetermined inner diameter;
   providing a quantity of a curable polymer;
   at least partially filling the first sacrificial tubing with the curable polymer;
   curing the curable polymer;
   removing the first sacrificial tubing to reveal a fiber optic core;
   providing a sacrificial heat shrink tubing;
   providing a thermoplastic tubing inside the sacrificial heat shrink tubing;
   placing the fiber optic core inside the thermoplastic tubing;
   applying heat to the thermoplastic tubing to thermally reflow material of the thermoplastic tubing around the fiber optic to form a cladding around the fiber optic core; and
   removing the heat shrink tubing to reveal a fully formed fiber optic component.

9. The method of claim 8, wherein the curable polymer comprises an ultraviolet light curable photopolymer.

10. The method of claim 8, wherein the thermoplastic tubing comprises a meltable polymeric material.

11. A method of forming a fiber optic component, comprising:
   providing a sacrificial heat shrink tubing;
   providing a thermoplastic tubing inside the sacrificial heat shrink tubing;
   providing a mandrel having a predetermined outer diameter selected to be equal to a desired outer diameter of a fiber optic core component;
   placing the mandrel inside the thermoplastic tubing;
   applying heat to the thermoplastic tubing to thermally reflow material of the thermoplastic tubing around the mandrel to form a cladding layer;
   removing the mandrel to leave the cladding layer;
   forming the fiber optic optical core by at least partially filling the cladding layer with a quantity of a curable polymer;
   curing the curable polymer; and
   removing the sacrificial heat shrink tubing to produce a fiber optic component.

* * * * *